…

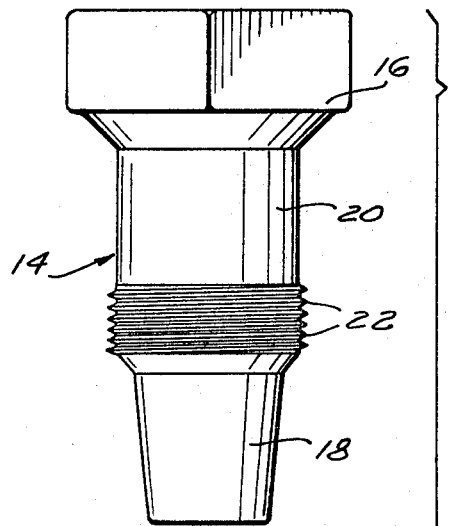
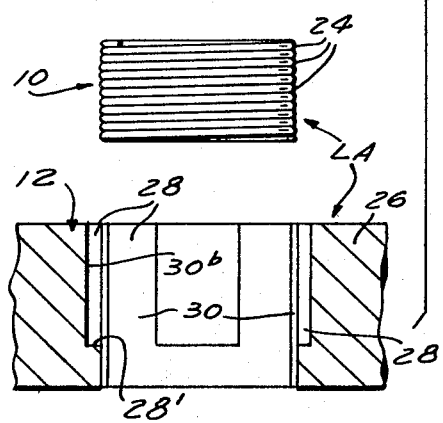
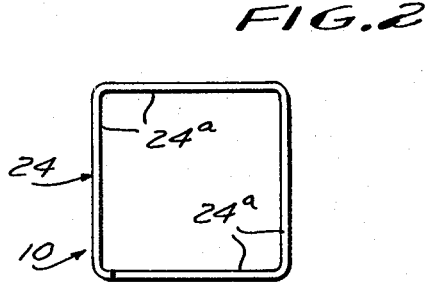
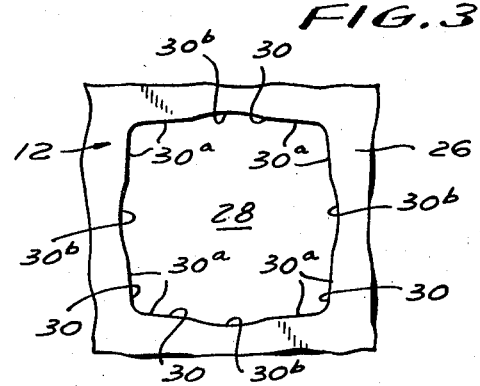
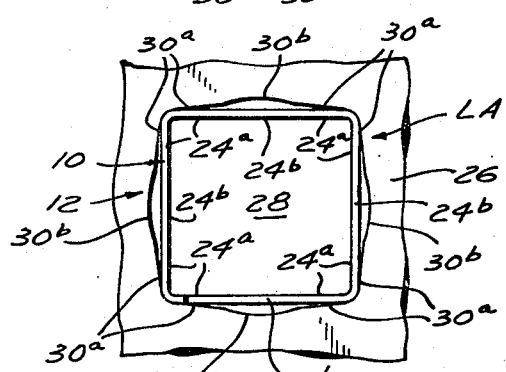
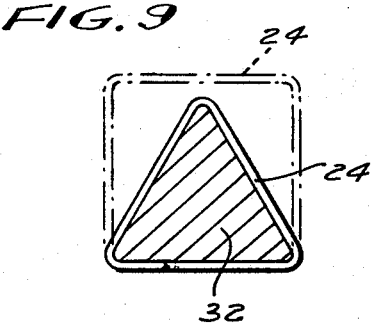

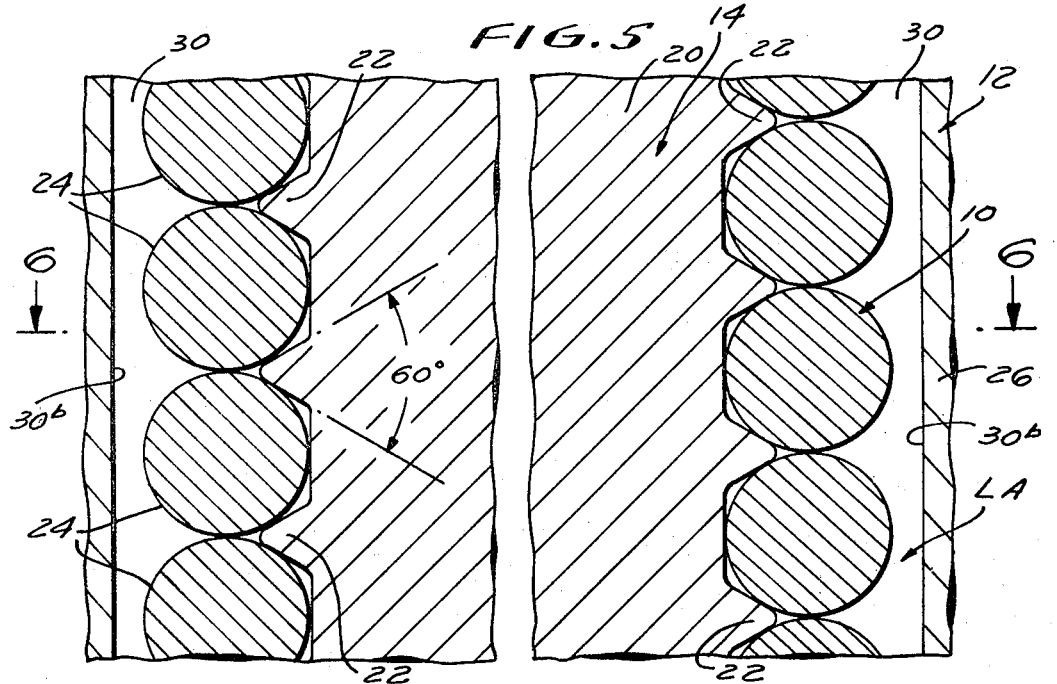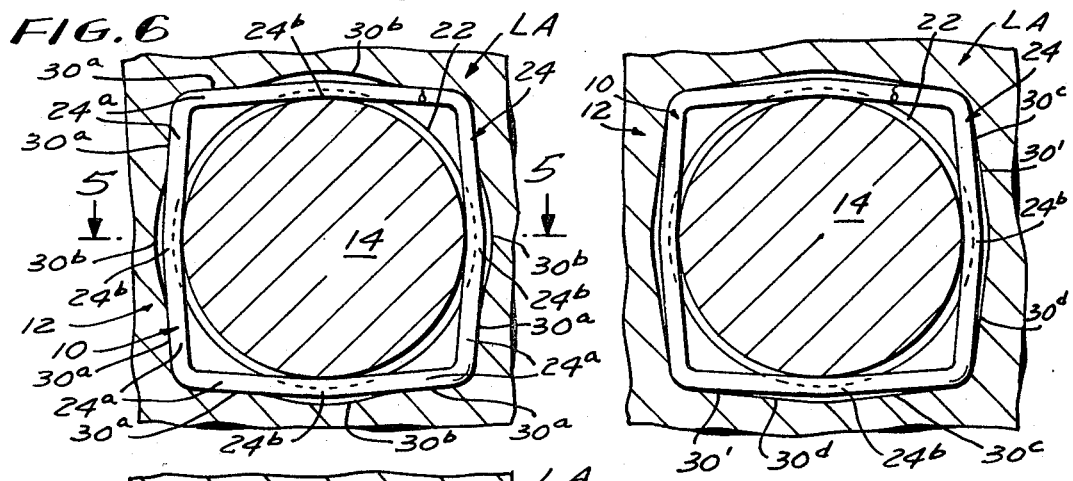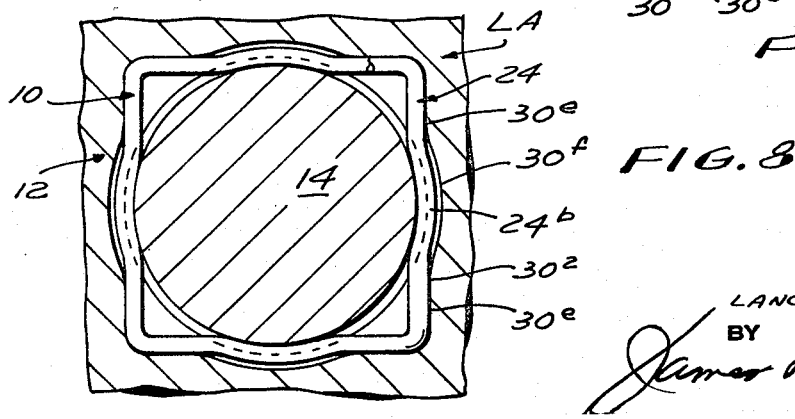

United States Patent Office 3,390,711
Patented July 2, 1968

3,390,711
SCREW-LOCK ASSEMBLY
Lance C. Wilcox, Wilton, Conn., assignor to Electric Regulator Corporation, Norwalk, Conn., a corporation of New York
Filed Aug. 9, 1967, Ser. No. 659,503
3 Claims. (Cl. 151—14)

ABSTRACT OF THE DISCLOSURE

A screw-lock in which the windings of a multi-winding coil metal spring act as the female threads for the thread of a screw, the windings being configured so that locking of the screw is effected by the resilient deformation of regions of sides of said windings which are thread engaged by the threads of the screw.

---

This invention relates to an improved locking assembly for a screw.

Difficulties are experienced in accurately positioning, locking and maintaining in positioned and locked condition screws employed in such mechanisms as needle valves and the like. It is requisite that such applied screws be maintained in a positioned and locked condition when subjected to wide temperature variations. The use of a nylon lock element, such as is conventional for this purpose, is found unsatisfactory because the characteristics of the nylon vary with heat and because differential behaviour of one side the nylon lock element with reference to another side tends to undesirably impart a cant to the screw.

The present invention has for its object the provision of an improved locking assembly for a screw structured for receiving and seating a screw, positioning the same accurately in its seat, and locking the screw in its seated position, the locking assembly being characterized by its ability to maintain the screw in its seated and locked position under conditions of widely varying temperatures.

To the accomplishment of this object and such other objects as may hereinafter appear, the invention relates more particularly to the screw lock assembly as sought to be defined in the appended claims, taken together with the following specification and the appended drawings in which:

FIG. 1 is an exploded or disassembled view depicting the elements of the locking assembly of the invention comprising a spring and a housing receptacle therefor, the latter being shown in section, and a type of screw for the locking assembly;

FIG. 2 is a plan view of the spring element of the locking assembly;

FIG. 3 is a plan view of the housing receptacle element;

FIG. 4 is a plan view depicting the assembly of the spring and receptacle elements;

FIG. 5 is a fragmentary vertical elevational view, taken in section in the plane of the line 5—5 of FIG. 6, drawn on an enlarged scale, of the parts shown in FIG. 1, depicting the screw seated in the locking assembly;

FIG. 6 is a plan view, drawn on a reduced scale, of the parts shown in FIG. 5, taken in section in the plane of the line 6—6 of FIG. 5;

FIG. 7 is a view similar to FIG. 6, showing a modification of the wall contour of the receptacle element;

FIG. 8 is also a view similar to FIG. 6, showing a further modification of the wall contour of the receptacle element; and FIG. 9 is a plan view of a mandrel used for winding a spring element such as is depicted in the other views.

Referring now more in detail to the drawings and having reference first to FIGS. 1 and 2, the locking assembly generally designated as LA, comprising a spring element 10 and a housing receptacle 12 therefor, is shown in relation to a type of screw 14 with which it is designed for use.

The screw 14, provided with a hexagonal head 16 and a reduced tapered nose 18 has its body 20 formed with the threads 22. The shape and pitch of the screw thread, which may be of any contour and design, are formed with the end in view of their being properly mated with the shape and design given to or selected for the spring element of the locking assembly, as will further be made clearer hereinafter.

The spring element 10 of the locking assembly LA is a multi-winding coil spring made of preferably round metal wire, having a number of closely wound windings or convolutions 24 designed for mating with and to act as the female threads for the threads 22 of the screw 14 as depicted in FIG. 5 of the drawings. The number of windings of the coil spring 10 preferably exceeds the number of threads in the screw 14 (see FIG. 1); and the pitch of the spring windings is made so as to be adapted to substantially correspond to the pitch of the screw threads 22 as best shown in FIG. 5. Each winding or convolution 24 of the coil spring 10 has a multi-sided cross-sectional shape, which in the embodiment shown is polyganol and preferably square as best shown in FIG. 2, the shape imparted thereto being such that the sides 24ª thereof are adapted to be threadedly engaged only at an intermediate region 24ᵇ of said sides by the screw thread 22, as best shown in FIG. 6 of the drawings.

The receptacle element 12 of the locking assembly LA is designed to receive and house the coil spring 10 and provide the proper anchoring therefor. The receptacle comprises a body 26 separately shown in FIGS. 1 and 3, having an opening 28 for receiving and housing the spring 10. The spring when mounted in the receptacle rests on a ledge 28' formed at the bottom of the opening 28. The walls 30 defining the opening 28 of the receptacle 12 (see particularly FIG. 3) are configured to provide terminal wall sections 30ª adapted to be engaged by end regions 24ª of the winding sides of the coil spring 10 for anchoring the latter, and having intermediate sections 30ᵇ registering with the intermediate regions 24ᵇ of said winding sides and depressed relative thereto, as best shown in FIG. 4 of the drawings, to define radially outwardly extending spaces, into which spaces said intermediate winding regions 24ᵇ are adapted to be forced. In the form of the invention shown in FIGS. 1 to 6, the terminal wall sections 30ª taper towards and merge into the intermediate wall sections 30ᵇ. In the illustrated embodiment of the locking assembly, where the normal cross-sectional shape of the windings is made in the form of a square, the overall cross-sectional shape of the walls of the housing receptacle is made to conform to the square shape of said windings. These described shapes of the coil spring and the housing receptacle and the normal relations therebetween when the spring is received by and mounted in the opening of the receptacle is depicted in FIG. 4 of the drawings.

FIGS. 5 and 6 of the drawings depict the action that takes place when a screw such as the screw 14 is mated with the locking assembly LA. The screw 14 is threadedly received by and accurately positioned in the coil spring 10, the windings 24 of the coil spring acting as female threads for the thread 22 of the screw. The end regions 24ª of the coil spring windings or convolutions are forcedly seated by the screw action in the terminal wall sections 30ª of the receptacle thereby firmly anchoring the windings of the coil spring 10 in the receptacle housing 12. The correspondence between the pitch and shape of the screw thread and the pitch and shape of the coil windings results in the generation of axial and radial components of force, evident upon viewing FIG. 5 of the drawings, for bringing about a forced engagement both radially and axially between the screw threads and the spring coil windings. The resilient interengagement between the screw threads and the spring convolutions to produce a resilient interlocking of the parts is brought about by the relation between the intermediate regions 24$^b$ of the windings and the registering depressed intermediate sections 30$^b$ of the receptacle walls; when the screw 14 is threaded into the coil spring 10, and the coil spring parts are anchored as described by the receptacle walls, the intermediate regions of the windings are resiliently forced radially outwardly into the spaces afforded by the intermediate depressed sections 30$^b$ of the receptacle. A firm spring locking for the screw is thereby secured. It is found that this locking assembly maintains the screw in its seated and spring locked position under conditions of widely varying temperatures.

FIGS. 7 and 8 are modifications of the receptacle element of the invention lock assembly LA showing different contours that may be given to the walls of the spring receiving opening thereof. In these figures the parts that are similar to the parts shown in FIG. 6 are designated by similar reference characters. In FIG. 7 each receptacle wall 30′ is configured to provide inclined anchoring sections 30$^c$ and 30$^d$ which join or merge at the wall center, where the wall forms the radially outwardly extending space into which the intermediate winding region 24$^b$ of the wire winding is forced by the seating action of the screw, as clearly shown in this figure. In FIG. 8 each receptacle wall 30$^2$ is configured to provide straight wall end anchoring sections 30$^e$ which connect with the intermediate depressed section 30$^f$ into which latter the intermediate winding region 24$^b$ is adapted to be forced by the seating action of the screw, as clearly shown in this figure.

FIG. 9 of the drawings shows a mandrel used for winding the cross-sectionally square shaped spring element 10 of the lock assembly. The mandrel 32 for this purpose is shaped cross-sectionally as an equilateral triangle. The wire spring 24 is wound on the mandrel 32 in triangular form as shown in full lines in this figure; and when removed from the mandrel, the wire spring opens and takes the square configuration shown in dash-dotted lines in this figure.

The use and operation of the screw lock assembly and the functioning and advantages thereof will in the main be apparent from the above detailed description thereof. It will be also apparent that changes may be made in the design of the elements of the lock assembly without departing from the spirit of the invention defined in the following claims.

I claim:

1. A locking assembly for a screw comprising a multi-winding coil metal spring adapted to receive a male screw with the windings of said coil spring acting as the female threads for the threads of the screw, the pitch of said windings being adapted to substantially correspond to the pitch of the screw threads, each winding having a multi-sided cross-sectional shape, sides thereof being adapted to be threadedly engaged only at an intermediate region of said sides by the screw thread; and a receptacle for receiving and housing said coil spring, the walls of said receptacle being configured to provide terminal sections engaged by end regions of said winding sides for anchoring the latter and having intermediate sections registering with said intermediate regions of said winding sides and depressed relative thereto to define radially outwardly extending spaces into which spaces said intermediate winding regions are adapted to be forced when said screw is threaded thereinto.

2. The locking assembly of claim 1 in which the normal cross-sectional shape of the windings of said coil spring is polyganol and the overall cross-sectional shape of the walls of said housing conforms to the polyganol shape of said windings.

3. The locking assembly of claim 1 in which the normal cross-sectional shape of the windings of said coil spring is square and the overall cross-sectional shape of the walls of said housing conforms to the square shape of said windings.

References Cited

UNITED STATES PATENTS

| | | | |
|---|---|---|---|
| 2,257,224 | 9/1941 | Bouchard | 85—32 |
| 2,275,993 | 3/1942 | Robertson | 151—30 |
| 2,363,663 | 11/1944 | Findley | 85—32 |
| 2,934,123 | 4/1960 | Brancato | 151—14 |

FOREIGN PATENTS

| | | |
|---|---|---|
| 598,800 | 2/1948 | Great Britain. |
| 646,671 | 11/1950 | Great Britain. |

MARION PARSONS, Jr., *Primary Examiner.*